Feb. 14, 1928.
L. BENOIT
1,659,076
APPARATUS FOR HANDLING EGG CARTONS
Filed Jan. 7, 1927   2 Sheets-Sheet 1
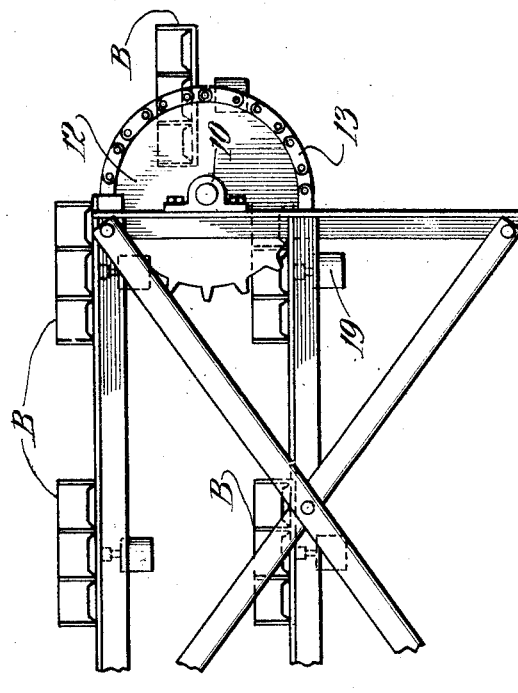
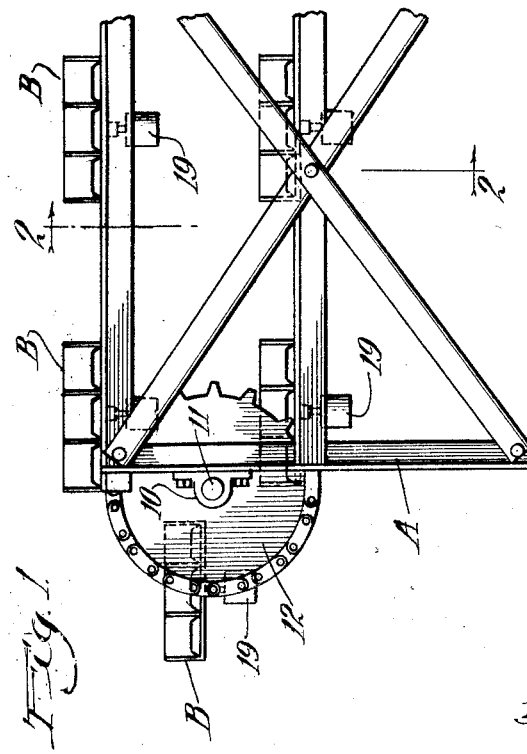
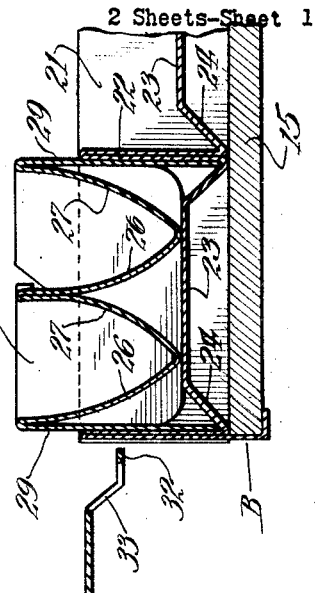
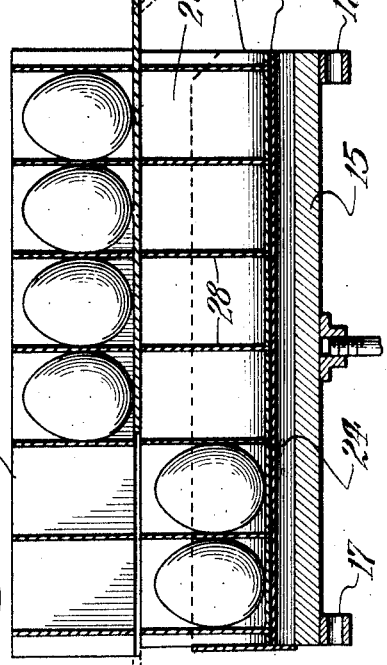
Inventor:
Leon Benoit,
by Atty's Feb. 14, 1928.
L. BENOIT
1,659,076
APPARATUS FOR HANDLING EGG CARTONS
Filed Jan. 7, 1927
2 Sheets-Sheet 2
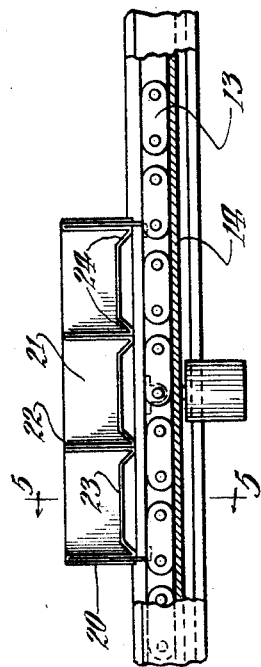
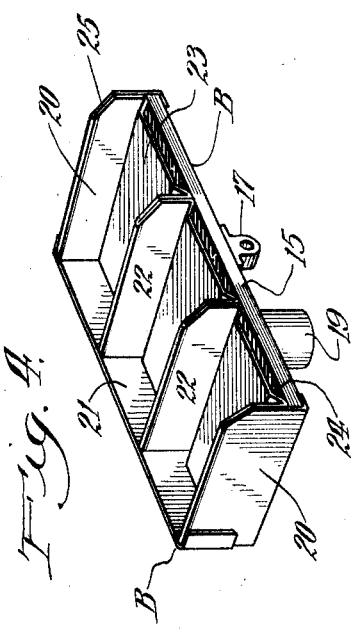
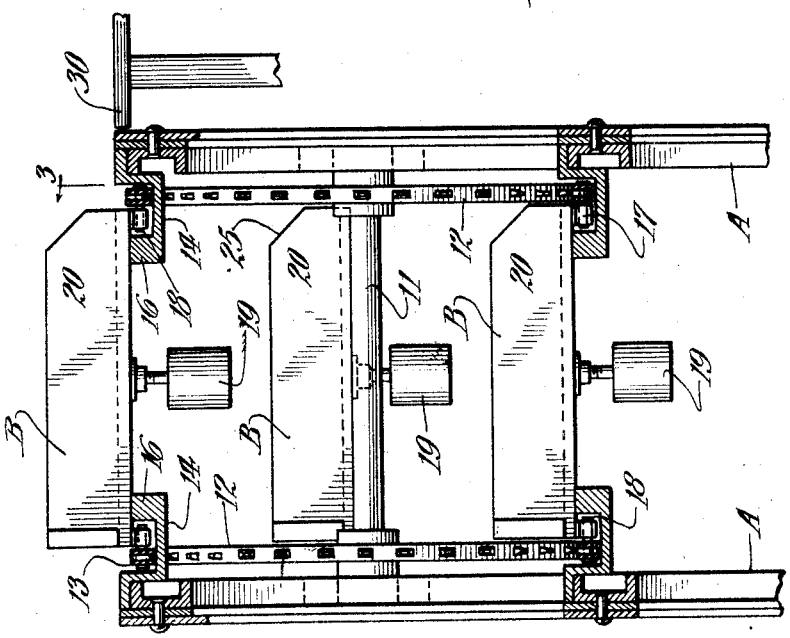
Inventor:
Leon Benoit,
by [signature]
Attys Patented Feb. 14, 1928.

1,659,076

UNITED STATES PATENT OFFICE.

LEON BENOIT, OF CHICAGO, ILLINOIS.

APPARATUS FOR HANDLING EGG CARTONS.

Application filed January 7, 1927. Serial No. 159,693.

This invention which relates to an apparatus for handling egg cartons is concerned particularly with a conveyor mechanism by which a number of cartons may be moved to successive positions before operators who attend to filling the cartons with eggs. It is a primary object of this invention to devise such an apparatus which will be simple, convenient for use, and rapid in its operation; which will move a number of trays or holders for the reception of one or more cartons each of which may be easily fitted thereinto or removed therefrom; to so position the several trays or holders that the cartons therein will be located in convenient relation to one or more adjacent worktables; and to provide a mechanism of compact arrangement which will have capacity for a maximum number of trays or holders so that the filling operation may proceed most expeditiously. These and other objects of my invention are set forth more fully hereinafter. A suggestive embodiment of the invention is also shown in the accompanying drawings in the manner following:

Figure 1 is a side elevation of the apparatus in its entirety;

Fig. 2 is a transverse section therethrough taken on line 2—2 of Fig. 1;

Fig. 3 is a sectional detail taken on line 3—3 of Fig. 2;

Fig. 4 which is a detail in perspective shows one of the carton trays or holders detached from the remaining mechanism;

Fig. 5 which is an enlarged sectional detail taken on line 5—5 of Fig. 3 shows one carton in process of being filled with eggs; and Fig. 6 is a transverse section through one carton and associated tray showing the manner in which the former is held in place.

The present apparatus may comprise a pair of connected frame units A, preferably made of iron bars of appropriate cross section. Each frame unit is vertically disposed, and spaced from the other to provide a mounting therebetween for a conveyor mechanism. As shown, bearings 10 are secured to opposite ends of the frame units for the reception of axles 11 on each of which is mounted a pair of sprocket wheels 12. An endless chain or belt 13 extends the length of the frame and passes over two of the sprocket wheels, and may additionally be slidably supported in channel guide members 14 adjacent the top and bottom of the wheels. The channel guide members are shown as supported by the frame units. From a suitable source of power, not shown, a motion, preferably continuous, is imparted to the sprocket wheels whereby the two chains are caused to move in unison.

With some such conveyor mechanism as has just been described, I associate a plurality of trays or holders B. In Fig. 4 is shown a multiple compartment tray, it being obvious, however, that the number of compartments is optional. In the construction shown each tray is provided with a base 15 having a length which is substantially the distance between the chains 13 and adapted for slidable support upon upturned flanges 16 which form part of the guide members 14. At opposite ends of the base I provide depending lugs 17 each having a hole for the reception of a stud or pin 18 which extends laterally from one of the chains, thus providing a pivotal mounting for the tray. The trays, while rested upon the flanges of the channel guides, are held upright, and in order that this position may be preserved during travel of the trays around the sprocket wheels at the ends of the frame, balancing means in the form of depending weights 19 may be provided, as shown.

The upper structure of each holder or tray includes an enclosure which may have two or three walls, the latter, by preference, consisting of sides 20 connected by a back wall 21; other partitions 22 may intervene between the sides, if desired, to provide multiple compartments. This upper part of the tray or holder may desirably be made of sheet metal. If the tray is to accommodate egg cartons having the cross sectional form of Fig. 6, it is desirable also to provide in each compartment a false bottom 23 having its side edges 24 downwardly inclined to provide channels, as shown. According to the construction suggested, the false bottom may be made from a piece of the same metal sheet which is used for the sides 20 and partitions 22. It may be desirable also to bevel off, as at 25, the upper corners of the sides and partitions at the open end of the tray, so as to facilitate the insertion and withdrawal of the cartons within the compartments thereof.

An apparatus of this character is adapted to receive and handle standard egg cartons. One such kind is shown in Figs. 5 and 6, and comprises two rows of pockets formed by longitudinal converging walls 26 and 27 with intersecting transverse walls 28. In this manner individual compartments each for the reception of a single egg are provided. The carton may also have a top which, as shown, consists of a pair of covers 29 each adapted to be folded over to enclose the eggs in one row, and having edge flaps capable of a further fold for insertion between the two rows. As shown in Fig. 6, the two covers are bent back reversely so as to lie along the outer sides of the carton. The width of these covers is such that their flaps extend into the channels adjacent the sides of the compartment intended for their reception. The false bottoms 23 support the cartons above the base 15, whereas the free edges of the carton flaps extend close thereto. The mounting thus provided is well suited to retain the cartons securely in position within the trays with the pockets of each carton exposed for the reception of eggs.

Adjacent the conveyor apparatus may be arranged a table 30 preferably at a height substantially the same as that of the top of its framework. This is also at substantially the same level as the bottom of the trays so that the cartons may be slid from the table into the trays, or vice-versa, without the necessity of any lifting operation. The trays may be faced towards opposite sides of the conveyor apparatus, if desired, and likewise worktables 30 may be positioned on either side, either for the length of the apparatus, or for such portions thereof as are found most convenient.

An expeditious method of filling the egg cartons is to slide beneath one filler in the egg crate a transfer plate 31 of the kind which is shown in Fig. 5. This may be formed with an offset end 32 and with a hand opening 33 permitting the fingers to support the plate body upon its under side while resisting upward movement at the offset end with the back of the hand. A filler 34 of eggs so placed on the transfer plate may be arranged over one or more cartons while positioned within the trays, following which the plate is withdrawn laterally to permit the eggs to drop into the individual pockets of the cartons. In the position shown in Fig. 5 the plate is partially withdrawn and two eggs have reached their final position; the remaining four eggs there shown are ready to fall into position as soon as the plate is further retracted.

An apparatus of the kind herein set forth is advantageous in many respects. It is compact and may be accommodated within a relatively small space. At the same time it provides working facility for a number of operators. An endless conveyor on which cartons are held upright at all points is particularly advantageous in this respect. With such an apparatus empty cartons may be installed sidewise in one tray as it passes down around the sprocket wheels at one end of the apparatus. On coming up at the other end, the filling operations may start. Succeeding operators may either fill other cartons which are positioned in trays, or remove those which already have been filled, or supply fresh unfilled cartons for succeeding operators to work upon. The particular disposition of each operator, as well as the work assigned to him, will, of course, be determined by what is found to be most effective in practice. A conveyor of this particular type is just one example of several which might be used. Other available kinds would include a wheeled carriage, a rotary table, etc. In any such apparatus, however, I would provide trays for the accommodation of cartons which are held open to receive eggs from a supply source, the arrangement and disposition of the several parts being such as are called for generally in the claims following.

I claim:

1. A means for handling egg cartons comprising a pair of endless chains mounted to travel in unison, a plurality of trays carried between the chains for travel therewith, a pivotal mounting for each tray, a support whereon each tray may slide throughout the straight portion of its travel, balancing means whereby each tray is maintained upright throughout the curved portion of its travel, walls extending around three sides of the tray leaving one end thereof open, and means affording a support in each tray for an egg carton, substantially as described.

2. A means for handling cartons in which is comprised a conveyor providing a mounting for a plurality of trays, each of which is equipped with walls forming a three sided enclosure with one end open and having a raised bottom with depending channels adjacent the sides thereof to receive an egg carton having a cover folded back with its free edge extended below the carton bottom into one of the channels of the tray substantially as described.

3. An apparatus for handling cartons in which is comprised a tray enclosed on three sides and provided with a bottom having depending channels adjacent opposite sides thereof for the reception of a carton, the cover whereof may be reversely bent to extend into the channel adjacent the bottom of the tray, substantially as described.

4. An apparatus for handling egg cartons which comprises a pair of endless chains mounted to travel in unison, a plurality of trays supported between the chains for travel therewith, each tray being formed to receive a carton with its cover folded back into open position, a sliding support for the trays the bottoms of which extend even with or above the support, and a worktable adjacent the supports permitting cartons to be slid therefrom into the trays and vice-versa, substantially as described.

5. A conveyor for handling egg cartons consisting of a pair of endless chains connected for unitary travel, wheels at opposite ends of the chains for the latter to travel over, supports between the wheels on which the chains may slide, a plurality of open-ended trays extending between the chains and slidable upon the supports thereof, the bottom of each tray being elevated above the chains and supports, and a worktable adjacent the conveyor and disposed at an elevation substantially the same as that of the tray bottoms whereby a carton may be slid from one to the other, substantially as described.

6. A means for handling egg cartons comprising a pair of endless chains mounted to travel in unison, a plurality of trays carried between the chains for travel therewith, a pivotal mounting for each tray, a support whereon each tray may slide throughout the straight portion of its travel, balancing means whereby each tray is maintained upright throughout the curved portion of its travel, an enclosure for the tray leaving one end thereof open, and means affording a support in each tray for an egg carton, substantially as described.

7. A means for handling cartons in which is comprised a conveyor providing a mounting for a plurality of trays, each of which is equipped with walls forming an enclosure with an open end and having a raised bottom with depending channels adjacent the sides thereof to receive an egg carton having a cover folded back with its free edge extended below the carton bottom into one of the channels of the tray, substantially as described.

8. An apparatus for handling cartons in which is comprised a tray open at one end and provided with a bottom, having a depending channel adjacent one side thereof, for the reception of a carton the cover whereof may be reversely bent to extend into the channel adjacent the bottom of the tray, substantially as described.

LEON BENOIT.